United States Patent [19]
Manabe et al.

[11] Patent Number: 6,023,043
[45] Date of Patent: Feb. 8, 2000

[54] METHOD OF WELDING IN THE HORIZONTAL POSITION AND WELDING APPARATUS THEREFOR

[75] Inventors: Yukio Manabe; Satoru Zenitani; Yoshinori Hiromoto, all of Hiroshima, Japan

[73] Assignee: Mitsubishi Heavy Industries, Ltd., Tokyo, Japan

[21] Appl. No.: 08/983,357

[22] PCT Filed: May 7, 1997

[86] PCT No.: PCT/JP97/01533

§ 371 Date: Jan. 12, 1998

§ 102(e) Date: Jan. 12, 1998

[87] PCT Pub. No.: WO97/43073

PCT Pub. Date: Nov. 20, 1997

[30] Foreign Application Priority Data

May 10, 1996 [JP] Japan ..................................... 8-140638

[51] Int. Cl.[7] .................................................... B23K 9/08
[52] U.S. Cl. ............................................ 219/123; 219/126
[58] Field of Search .................................. 219/123, 126, 219/137 R

[56] References Cited

U.S. PATENT DOCUMENTS 4,190,760  2/1980  Kano et al. ............................ 219/123

FOREIGN PATENT DOCUMENTS

| 45-34446 | 11/1970 | Japan . |
| 61-232080 | 10/1986 | Japan . |
| 62-038768 | 2/1987 | Japan . |
| 63-108973 | 5/1988 | Japan . |
| 8-132231 | 5/1996 | Japan . |
| 336113 | 5/1972 | Russian Federation ............... 219/123 |

*Primary Examiner*—Clifford C. Shaw
*Attorney, Agent, or Firm*—Evenson, McKeown, Edwards & Lenahan, P.L.L.C.

[57] ABSTRACT

The object of this invention is to prevent the occurrence of welding defects such as undercuts, overlaps and faulty angles of fusion, and to increase the efficiency of welding in the horizontal position. Auxiliary wires 5a and 5b are inserted into molten pool 12, and a unidirectional current is made to flow between them. A magnetic field 9 is induced which is approximately orthogonal to the surface of the parent material so as to generate an upward Lorentz force (opposite the pull of gravity) in molten pool 12. This force supports the molten metal and prevents it from dripping, resulting in a better-shaped bead.

8 Claims, 6 Drawing Sheets

Without Magnetic Field    With Magnetic Field (0.01 T)

Fig. 5

Electric currents A

METHOD OF WELDING IN THE HORIZONTAL POSITION AND WELDING APPARATUS THEREFOR

TECHNICAL FIELD

This invention concerns a method of welding in the horizontal position, in which the molten pool is liable to experience deformation under the influence of gravity, and a welding apparatus for that purpose. More specifically, it concerns a welding method in the horizontal position to be used in the production of large structures such as smokestacks, bridges, pressure vessels and the like, and a welding apparatus for that purpose.

BACKGROUND OF THE TECHNOLOGY

Welding has been an indispensable process in the manufacture of large steel structures such as smokestacks, bridges and pressure vessels. Because such large structures cannot easily be inverted during production, some portions must be welded in the horizontal position.

In butt welding, four welding positions may be used: the flat position, the horizontal position, the vertical position and the overhead position. In fillet welding, four welding positions also may be used: the flat position, the horizontal position, the vertical position and the overhead position.

Generally, "welding in the overhead position" refers to welding a joint from below with the axis of the weld approximately horizontal. "Welding in the flat position" refers to welding a joint from above with the axis of the weld approximately horizontal. "Welding in the horizontal position" refers to welding a joint from the side with the axis of the weld approximately horizontal. "Welding in the vertical position" refers to welding a joint with a vertical axis of the weld lengthwise along the vertical.

In the disclosures which follow, the phrase "welding in the horizontal position" will refer to welds such that the angle of the parent material with respect to a horizontal surface is either approximately vertical or within the range of 45° to 90°; and the weld line is either approximately horizontal or its angle with respect to a horizontal surface is within the range of 0° to 45°.

In other words, the present invention is also applicable in a range of welding positions which might be called intermediate between the common overhead, flat and horizontal positions. In this discussion we shall use the phrase "horizontal position" in the wider meaning specified above.

Figure 9:
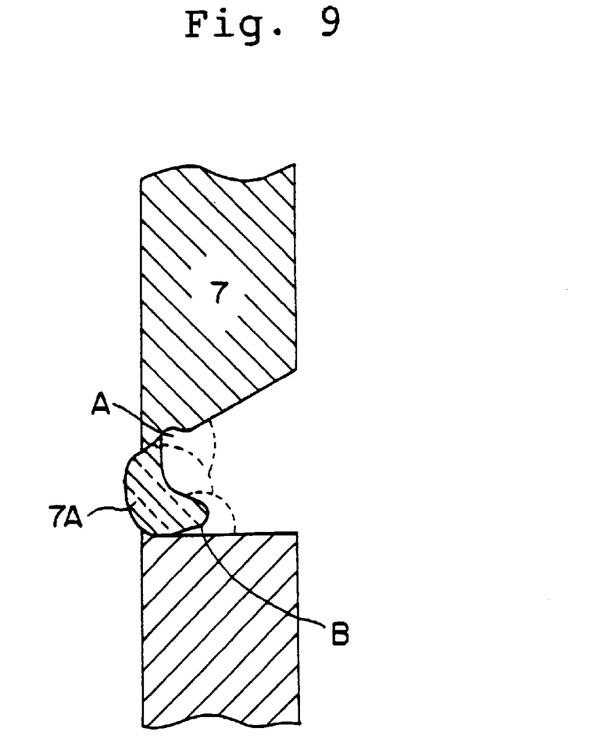
FIG. 9 is a cross section of the welding area when the prior art welding method is used.

When a joint is welded in the horizontal position, as shown in the sketch in FIG. 9, the weight of the molten metal gives weld bead 7A a tendency to sag, with the result that the upper portion of the open end of the bead is undercut (A in FIG. 9) while the lower portion has an overlap (B in FIG. 9). This may lead to welding defects such as inadequate fusion when the subsequent layer is welded. This is why such welding is usually executed by a highly-skilled welder using a semi-automated process.

Even if this welding process is automated, the welding apparatus must have the same level of capability as a skilled welder mentioned above. A number of weaving mechanisms will be necessary. And since such mechanisms are still not enough, the process must be conducted at a low temperature with a resulting low efficiency. This stands in the way of making the welding process more efficient.

With the techniques used in the prior art, then, welding defects such as an undercut of the upper portion of the open end of the bead or an overlap of the lower portion were likely to occur when a joint was welded in the horizontal position.

DESCRIPTION OF THE INVENTION

The object of the present invention is to provide a method of welding in the horizontal position which is highly efficient and which prevents the occurrence of defective welds caused by undercuts or overlaps, and to provide a welding apparatus to execute this method.

In order to solve the problems outlined above, the present invention is designed as follows. It concerns a method of welding in the horizontal position, in which a heat source such as an arc, a laser or an electron beam is used to melt the parent material and form a molten pool. Because of the position of the weld, gravity tends to cause the bead to deform.

This welding method is distinguished by the following. A current is made to flow in the molten pool in approximately the same direction as the weld line, and a magnetic field is induced in the molten pool orthogonal to the direction of the current. The joint is welded while an upward Lorentz force (opposite the direction of gravity) is generated in the molten pool.

The means suggested in the embodiments, which will be discussed shortly, by which a current is made to flow in the direction of the weld line in the molten pool, comprise a plurality of auxiliary wires. These wires are inserted into the molten pool and a current is passed through them. However, as long as a current, ideally a unidirectional current, can be made to flow in the molten pool in the direction of the weld line, the means need not be limited to a plurality of auxiliary wires.

To be more specific, it would also accord with the present invention if, when an arc is used as the heat source for welding, a portion of the welding current were split off and passed through the auxiliary wires.

A welding apparatus according to this invention which is advantageous to implement the welding method is distinguished by the fact that it comprises: a heat source for welding comprising an arc, a laser or an electron beam; a plurality of auxiliary wires placed so as to face the molten pool formed by the heat source; a power supply for generating a current to run through the wires; and a magnetic field inducing means to induce a magnetic field in the molten pool which intersects the surface of the parent material.

If a welding apparatus is used which employs an arc as the heat source for welding, an apparatus can be provided to pass a portion of the welding current into the auxiliary wires.

Figure 2:
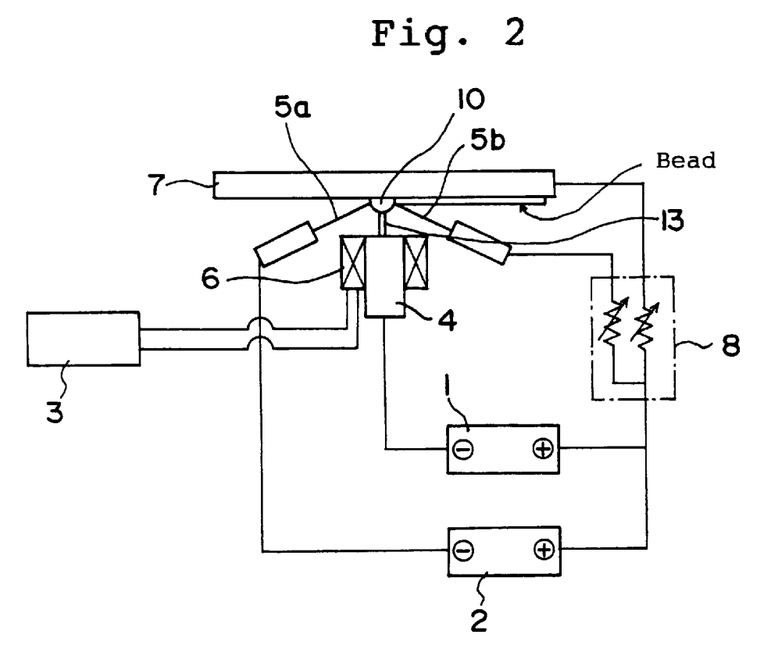
FIG. 2 shows the circuit connections in a welding apparatus in the horizontal position which is a second preferred embodiment of this invention.
Figure 3:
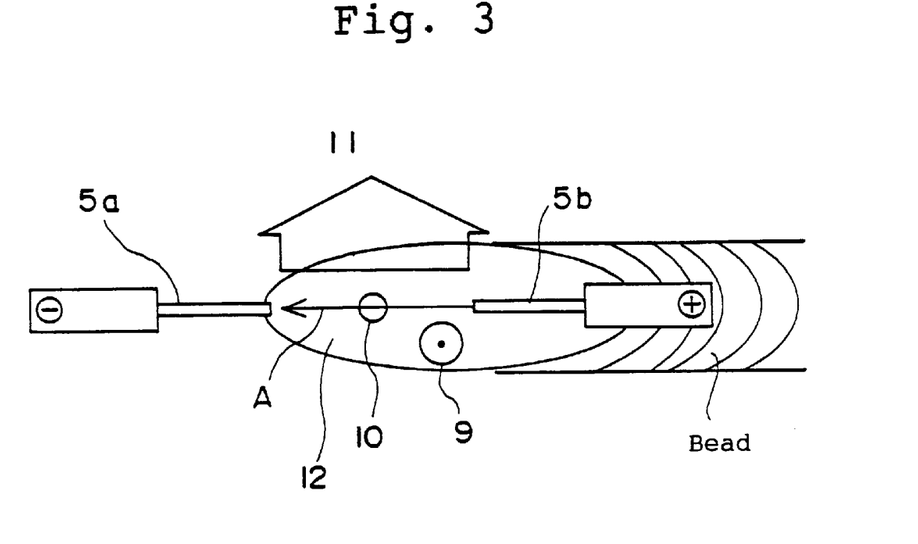
FIG. 3 is a drawing to illustrate how the molten metal is supported in the method of welding in the horizontal position according to this invention.

The operation of this invention will be discussed with reference to the circuit connection diagrams in FIGS. 1 and 2 and the drawing in FIG. 3 showing how the molten metal is upheld.

Figure 1:
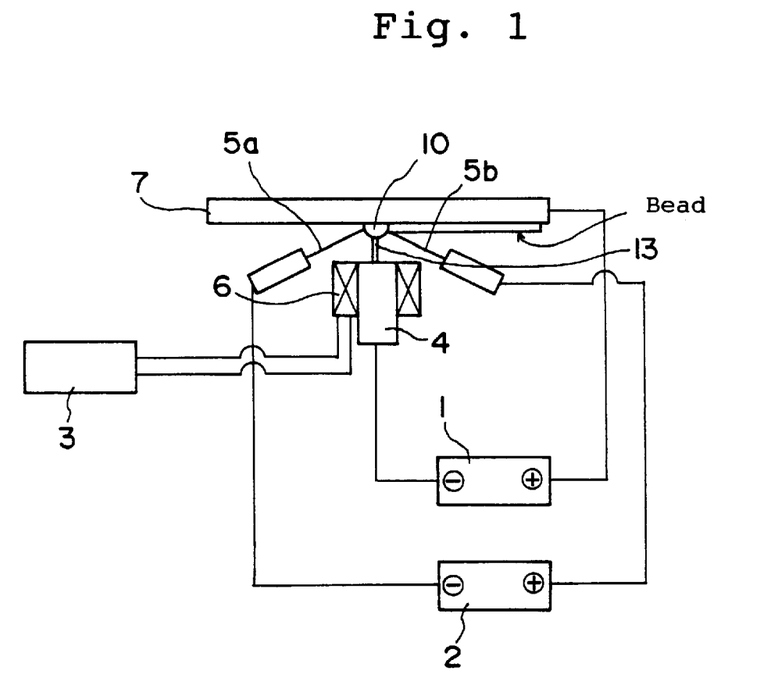
FIG. 1 shows the circuit connections in a welding apparatus in the horizontal position which is a first preferred embodiment of this invention.

In FIGS. 1 and 2, two auxiliary wires 5a and 5b are used. As is shown in FIG. 1, the minus and plus sides of power supply 2 are connected to the respective wires. In addition to this, or instead of power supply 2, a portion of the welding current can be passed to auxiliary wire 5b, as shown in FIG. 2. When a current is conducted between auxiliary wires 5a and 5b, a unidirectional current A is created in molten pool 12. When magnetic field 9 is induced in a vertical direction in the drawing, a Lorentz force 11 is activated in the direction which allows it to support the molten pool. This prevents the weld bead from sagging.

When a current is conducted through auxiliary wires 5a and 5b, these wires are heated by the Joule effect, and their deposition rate is enhanced.

If a number of auxiliary wires are used, the surface area of the wires which can absorb the radiant heat of the arc will be larger. Thus the melting capability of the wires will increase.

Figure 10:
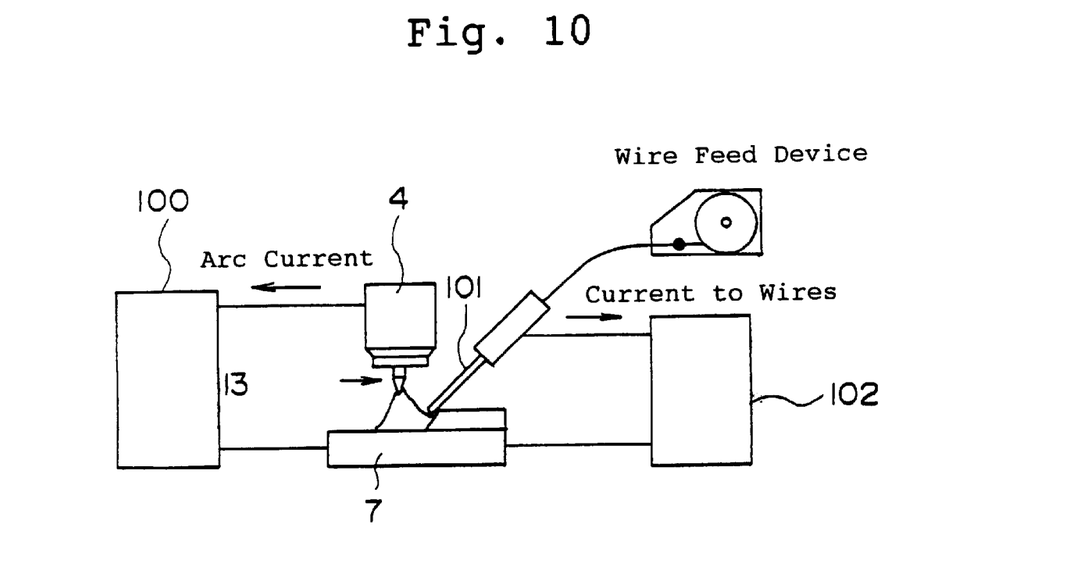
FIG. 10 shows an apparatus employing the TIG hot-wire welding method, a method belonging to the prior art.

The TIG hot-wire welding method is similar to the method according to this invention. In the TIG method, as shown in FIG. 10, heating power supply 102, which passes a current into consumable wire 101, is separate from TIG arc power supply 100. Current is supplied to consumable wire 101 from a point approximately 10 cm away from parent material 7, and the resistance heating heats wire 101. Since wire 101 is sent to the molten pool in a half-melted state, the deposition rate is increased by up to three times that of the usual method.

The TIG hot-wire welding method and that according to the present invention have in common that they both involve supplying current to a consumable wire. However, the object of the former method is to heat the wire by resistance and send it to the molten pool in a half-melted state. That of the present invention is to pass a current through multiple melting wires in the direction of the weld line, and so induce a magnetic field in the molten pool 12 which is roughly orthogonal to the current. In this way a Lorentz force 11 will be activated in an upward direction in the molten pool 12. The basic concepts underlying the two methods are different, as are the necessary configurations: the former uses a single consumable wire, while the present invention uses two auxiliary wires, 5a and 5b, to pass a current in molten pool 12 in the direction of the weld line. Auxiliary wires 5a and 5b need not be consumable wires.

Figure 7:
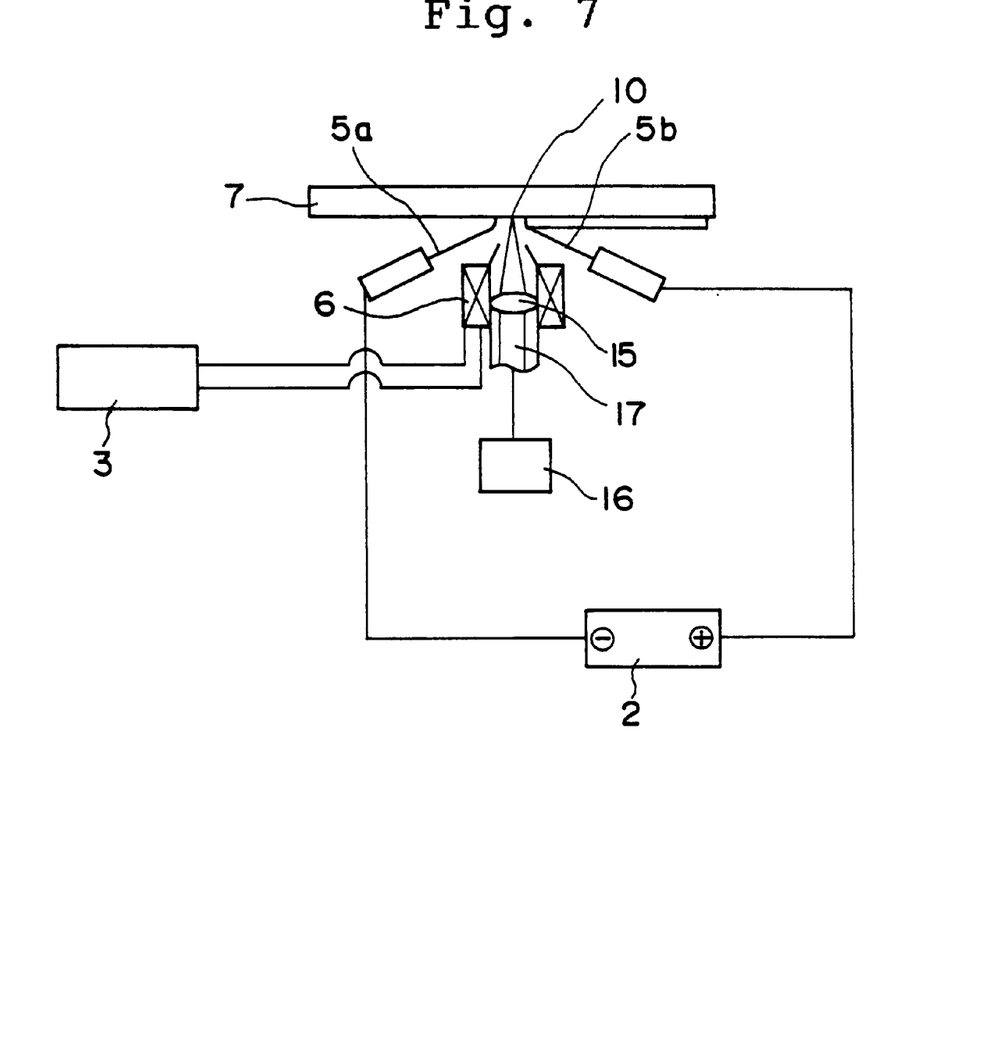
FIG. 7 shows the circuit connections in a welding apparatus in the horizontal position which is a fifth preferred embodiment of this invention. In this figure, (A) is an enlarged perspective drawing of the magnetic coil.

As the apparatus to apply a magnetic field, an apparatus may be provided, as shown in FIG. 7, which concentrates the heat source and applies a magnetic field.

The present invention is particularly advantageously applied when the weld line is approximately horizontal and the surface of the parent material is approximately vertical. However, the effects of this invention are readily achieved throughout the range of horizontal position welding defined above, so long as a Lorentz force is generated in an upward direction (against the force of gravity) in the molten pool while the joint is welded.

PREFERRED EMBODIMENTS

We shall now discuss in detail several preferred embodiments of this invention, with reference to the drawings. To the extent that the dimensions, material, shape and relative positions of the constituent components are not specifically disclosed in these embodiments, the scope of the present invention is not limited only to those in the embodiments, which serve merely as illustrative examples.

Figure 4:
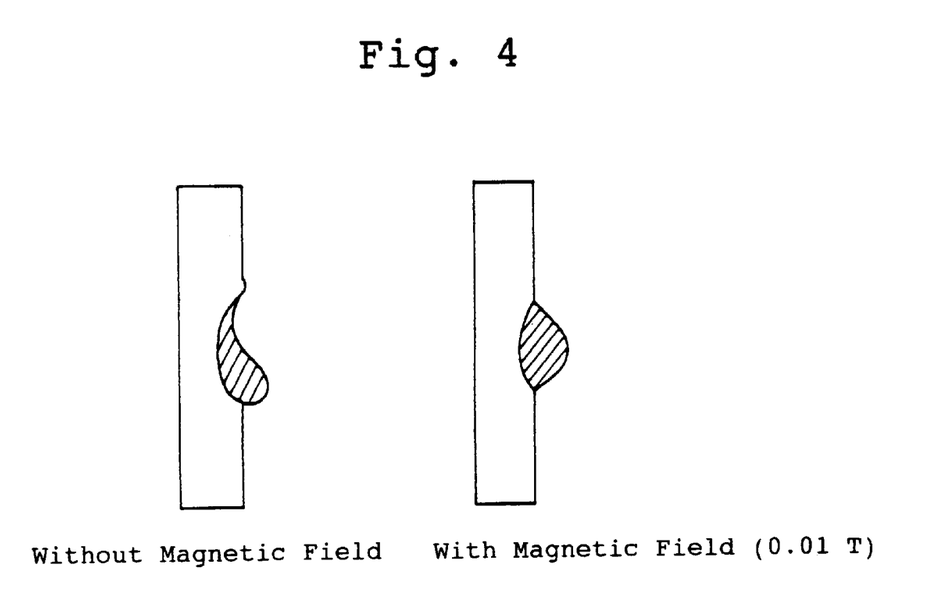
FIG. 4 shows cross sections of the bead in horizontal position welding. (A) shows the appearance of the bead without the application of a magnetic field. (B) is a cross section of a bead produced according to this invention.

FIGS. 1, 3 and 4 show a first preferred embodiment of this invention. This method, and the apparatus to make use of it, are used in TIG welding in the horizontal position. It employs an arc for heat source 10 and a nonconsumable electrode (a tungsten electrode) for electrode 13. In FIG. 1, 1 is the welding power supply. A TIG welding power supply with DC constant current characteristics is used. An arc (the heat source) is generated between electrode 13, which protrudes from welding torch 4, and parent material 7. The heat of the arc melts the parent material.

As can be seen in FIGS. 1 and 3, auxiliary (melting) wires 5a and 5b are placed on molten pool 12 on either side of arc heat source 10. The wires 5a and 5b are connected, respectively, to the minus and plus sides of power supply 2. In this way a current is made to flow horizontally parallel to the weld line. The power supply 2 supplies a direct current and generates a constant electric field.

In addition to or instead of power supply 2, a current splitting device 8 shown in FIG. 2 can be used to pass a portion of the welding current to wire 5b. Current splitting device 8 may comprise two variable resistors so that the current supplied to auxiliary wire 5b may be varied.

The welding torch 4 is surrounded by magnetic coil 6, which is connected to power supply 3. Magnetic field 9 can be induced in the direction which appears to be upward in FIG. 1 (horizontally and orthogonal to the weld line).

With this configuration, as can be seen in FIG. 3, the current which flows in molten pool 12 between the auxiliary wires 5a and 5b generates a unidirectional current A along a horizontal path parallel to the weld line. When a magnetic field 9 is induced which is orthogonal to the weld line and to the unidirectional current A, a Lorentz force 11 is generated which operates so as to uplift molten pool 12 (i.e., it operates against the force of gravity). This produces a weld bead which does not sag.

When a current is passed through auxiliary wires 5a and 5b, they are heated by the Joule effect just as in TIG hot-wire welding methods belonging to the prior art, and their deposition rate increases. However, the present invention makes use of multiple wires, 5a and 5b, so there is a greater surface area of these wires to absorb the radiant heat of arc heat source 10. As a result, the melting capacity of wires 5a and 5b is increased.

The effect of this embodiment is verified from the shape of the bead obtained in a bead-on-plate welding test. The conditions of welding are a welding current of DC:500 A and a current to the wires of DC:120 A. The deposition rate of wires 5a and 5b is 100 g/min. The welding speed is 50 cm/min.

The strength of the magnetic field 9 applied to molten pool 12 can be varied. The magnetic density is varied by changing the strength of the current from power supply 3 to magnetic coil 6, which is wound around TIG welding torch 4 as shown in FIG. 1. Varying this current during welding will cause the magnetic flux density to vary.

FIG. 4 shows two cross sections of the welding location. In the one on the left, no magnetic field is applied. In the one on the right, a field with a magnetic flux density of 0.01 T (tesla) is applied. (The current from power supply 3 which induces the field is DC. The welding is done in a bead-on-plate test.) If we compare the two, we see clearly that the welding method according to this invention produces a bead which is buoyed up against the force of gravity.

Just as in the TIG hot-wire welding method, passing a current through auxiliary wires 5a and 5b causes them to heat up due to the Joule effect. As a result, the welding speed is increased. With this configuration, the welding speed will be two to three times that achieved if a current is not passed through wires 5a and 5b.

FIG. 2 illustrates the circuit connections in a welding apparatus in the horizontal position which is a second preferred embodiment of this invention. In the embodiment shown in this figure, current splitting device 8 is placed in a location where the currents from power supplies 1 and 2 are confluent. A portion of the welding current supplied to parent material 7 is split off and supplied to auxiliary wire 5b. Current splitting device 8 comprises two variable resistors so that the current supplied to auxiliary wire 5b may be varied. Thus a circuit configuration such that a portion of the welding current is supplied to one of the auxiliary wires will yield the same result as did the configuration used in the first embodiment.

Figure 5:
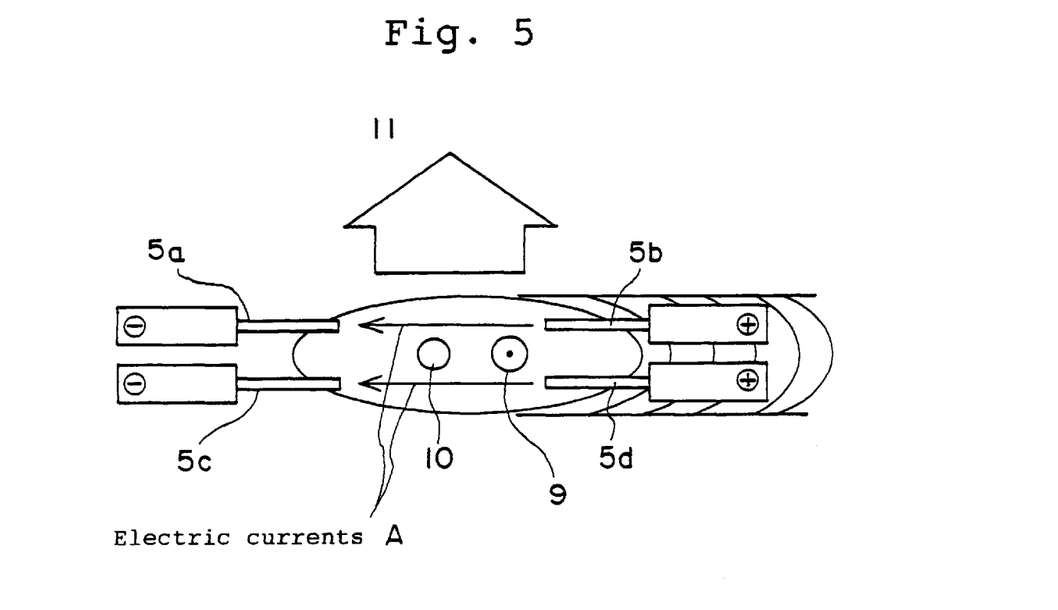
FIG. 5 shows the circuit connections in a welding apparatus in the horizontal position which is a third preferred embodiment of this invention.

FIG. 5 illustrates the circuit connections in a welding apparatus in the horizontal position which is a third preferred embodiment of this invention. In this figure, the same TIG welding method is used as in the first embodiment. Auxiliary wires 5a and 5b are on either side of arc heat source 10, but in this embodiment four wires are used, two on each side. To be more specific, one pair of auxiliary wires 5a and 5b is above heat source 10 and one pair is below it, parallel to the first pair, with the result that two unidirectional currents A are made to flow. This configuration achieves the same result as the first embodiment, except that the unidirectional current A is distributed over a larger area. This causes an upward Lorentz force to operate throughout molten pool 12 to produce a bead with a flat, smooth surface.

Figure 6:
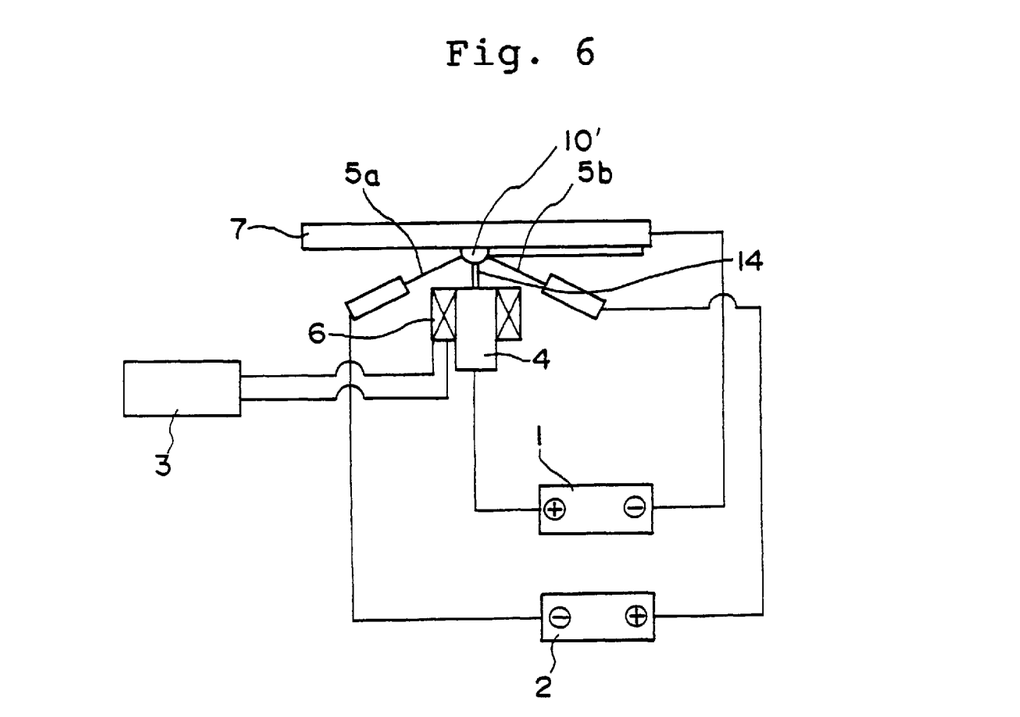
FIG. 6 shows the circuit connections in a welding apparatus in the horizontal position which is a fourth preferred embodiment of this invention.

FIG. 6 illustrates the circuit connections in a welding apparatus in the horizontal position which is a fourth preferred embodiment of this invention. In this figure, an arc is used as the heat source. Consumable electrode 14 is used to generate the arc instead of the non-consumable electrode in FIG. 1. This configuration achieves the same effect as the first embodiment.

FIG. 7 illustrates the circuit connections in a welding apparatus in the horizontal position using a laser as the heat source. This is a fifth preferred embodiment of this invention. In this figure, a YAG or $CO_2$ laser is used as the heat source. (In this example, the laser output is 4.5 Kw and the welding speed is 50 cm/min.) The current which flows in molten pool 12 consists only of the current between auxiliary wires 5a and 5b; however, the same result is achieved as in the first embodiment.

16 in the drawing is a laser oscillator, and 15 is a condenser lens. Laser beam 17 is condensed onto the surface of the parent material. Magnetic coil 6 is wound around the condenser lens 15. On the top of magnetic coil 6, as is shown in (A), is a hollow member 61 formed of a magnetic metal and tapering conically. This hollow member condenses the magnetic field onto the focal point of the laser beam 17.

Figure 8:
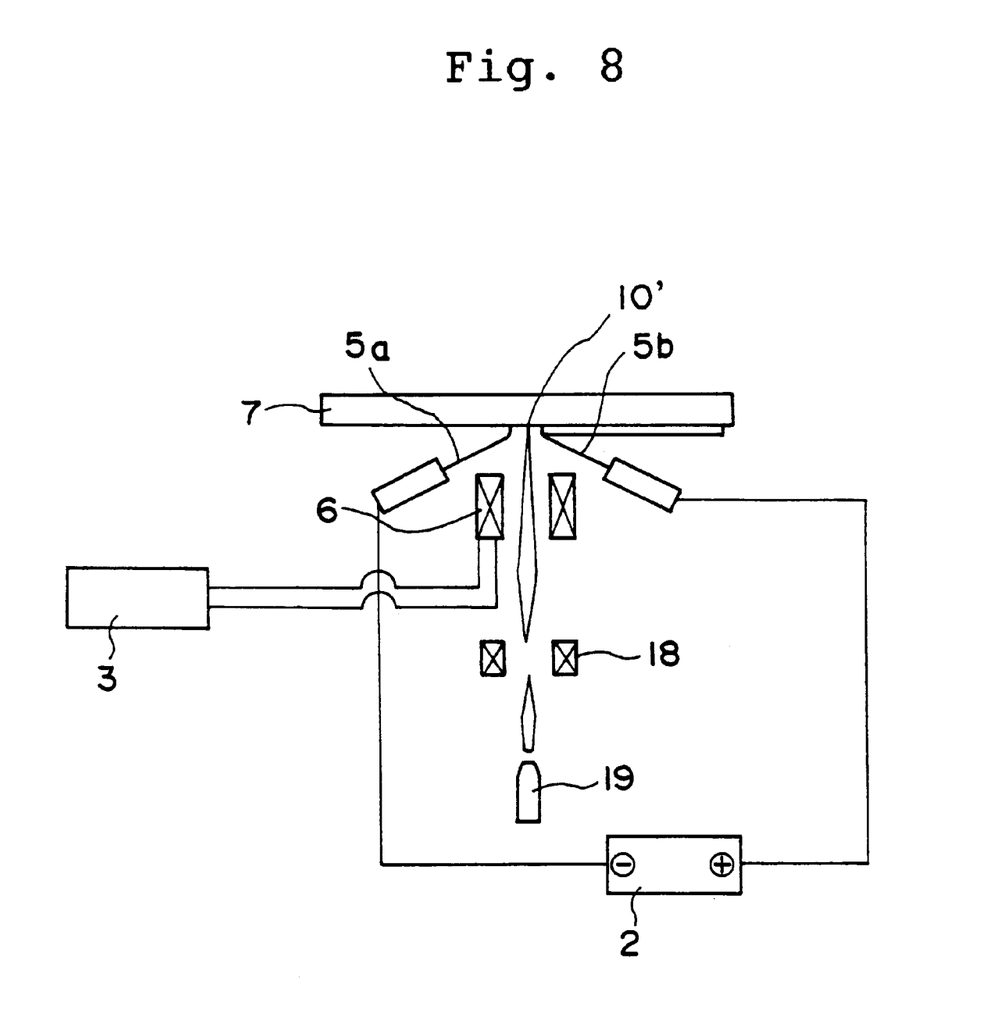
FIG. 8 shows the circuit connections in a welding apparatus in the horizontal position which is a sixth preferred embodiment of this invention.

FIG. 8 illustrates the circuit connections in a welding apparatus in the horizontal position which uses an electron beam as the heat source. This is a sixth preferred embodiment of this invention. As can be seen in the drawing, an electron beam is used as the heat source. If the voltage used to accelerate the beam is 60 kV, the beam current is 10 Ma, and the welding speed is 50 cm/min, the same result is achieved as in the first embodiment.

In the drawing, 19 is an electron gun and 18 is a condenser lens. Electron beam 10' is condensed onto the surface of the parent material. Magnetic coil 6 is wound around the electron beam 10' in the vicinity of parent material 7.

In each of the described embodiments, the current between auxiliary wires 5a and 5b and that flowing into the electromagnet are DC. However, the same effects could be achieved with AC currents by changing the superposition of the DC components as well as their duty factors and by controlling the phase relationship between the aforementioned two currents.

EFFECTS OF THE INVENTION

With this invention, as has been discussed above, a current is made to flow in the molten pool in the direction of the weld line when a joint is being welded in the horizontal position. A magnetic field is induced in the pool so as to generate in that pool an upward Lorentz force (opposite to the pull of gravity). This force supports the molten metal and prevents it from dripping, resulting in a better-shaped bead. Various other effects are also achieved.

We claim:

1. A method of welding in a horizontal position in which a parent material is melted using a specified heat source to produce a molten pool which is liable to experience deformation under the influence of gravity comprising the steps of:

generating an electric current flow in said molten pool independent of the specified heat source and approximately along a direction of a weld line; and inducing a magnetic field in said molten pool approximately orthogonal to the direction of said electric current to generate an upward Lorentz force opposite a pull of gravity in said molten pool.

2. A method of welding in a horizontal position according to claim 1, wherein said electric current flow is generated by inserting a plurality of auxiliary wires into said molten pool in order to cause said electric current in said molten pool to flow in approximately the same direction as said weld line.

3. A method of welding in a horizontal position according to claim 2, wherein said electric current flow in approximately said same direction as said weld line is a unidirectional current.

4. A method of welding in a horizontal position according to claim 1, wherein said heat source is an arc, and a portion of a welding current for said arc is split off and provided to an auxiliary wire.

5. A welding apparatus, comprising:

a heat source for welding;

a plurality of auxiliary wires provided so as to face a molten pool formed by said heat source and permit an electric current to flow in said molten pool substantially in said welding direction;

a power source for said plurality of auxiliary wires; and a magnetic field generating means to generate a magnetic field in said molten pool, magnetic lines of force of said magnetic field intersecting a surface of a parent material and being substantially perpendicular to said current;

wherein said current and said magnetic field generate a Lorentz force oriented upwardly opposite a pull of gravity in the molten pool.

6. A welding apparatus according to claim 5, wherein said heat source is an arc, and a current splitting device splits off a portion of a welding current for said heat source and provides said portion to said auxiliary wires.

7. A welding apparatus according to claim 5, further comprising a magnetic condensing means to condense said magnetic field onto said molten pool.

8. A welding apparatus according to claim 5, wherein said heat source for welding is an arc, a laser or an electron beam.

* * * * *